United States Patent
Wu et al.

(10) Patent No.: US 9,373,035 B2
(45) Date of Patent: Jun. 21, 2016

(54) IMAGE CAPTURING METHOD FOR IMAGE RECOGNITION AND SYSTEM THEREOF

(71) Applicant: Etron Technology, Inc., Hsinchu (TW)

(72) Inventors: Ben Wu, Taipei (TW); Ming-Che Ho, Kaohsiung (TW); Chih-Kao Chen, New Taipei (TW)

(73) Assignee: eYs3D Microelectronics, Co., Neihu Dist., Taipei (TW)

( * ) Notice: Subject to any disclaimer, the term of this patent is extended or adjusted under 35 U.S.C. 154(b) by 332 days.

(21) Appl. No.: 13/890,267

(22) Filed: May 9, 2013

(65) Prior Publication Data

US 2013/0329947 A1    Dec. 12, 2013

(30) Foreign Application Priority Data

Jun. 6, 2012  (TW) .............................. 101120242 A

(51) Int. Cl.
*G06K 9/00* (2006.01)
*G06K 9/32* (2006.01)

(52) U.S. Cl.
CPC .......... *G06K 9/00624* (2013.01); *G06K 9/3241* (2013.01)

(58) Field of Classification Search
None
See application file for complete search history.

(56) References Cited

U.S. PATENT DOCUMENTS

| | | | | |
|---|---|---|---|---|
| 4,500,203 A * | 2/1985 | Bieringer | ................. | 356/239.4 |
| 4,547,050 A * | 10/1985 | Collender | ................. | 352/43 |
| 6,141,034 A * | 10/2000 | McCutchen | ................. | 348/36 |
| 6,191,808 B1 * | 2/2001 | Katayama et al. | ............. | 348/39 |
| 6,819,356 B1 * | 11/2004 | Yumoto | ............ | G06F 17/30265 348/231.2 |
| 9,101,279 B2 * | 8/2015 | Ritchey | ................. | G03B 37/00 |
| 2008/0211915 A1 * | 9/2008 | McCubbrey | ................. | 348/159 |
| 2008/0225128 A1 * | 9/2008 | Uchiyama | ............. | H04N 5/232 348/211.2 |
| 2012/0287222 A1 * | 11/2012 | Liu | ................. | H04N 5/23238 348/14.07 |
| 2013/0329059 A1 * | 12/2013 | Uchikoshi | ............. | G06F 3/005 348/207.1 |
| 2015/0055821 A1 * | 2/2015 | Fotland | ................. | 382/103 |

FOREIGN PATENT DOCUMENTS

| CN | 101316323 A | 12/2008 |
|---|---|---|
| CN | 102156537 A | 8/2011 |
| CN | 102322799 A | 1/2012 |

* cited by examiner

*Primary Examiner* — Nancy Bitar
(74) *Attorney, Agent, or Firm* — Winston Hsu; Scott Margo

(57) ABSTRACT

An image capturing method includes providing at least three image capturing devices arranged along a same direction and an image processor, the at least three image capturing devices capturing at least three first images, determining a target object in the at least three first images, activating a first pair of image capturing devices of the at least three image capturing devices according to shooting angles of the target object in the at least three first images in order to capture a first pair of motion images, and the image processor performing image recognition to the target object of the first pair of motion images.

13 Claims, 7 Drawing Sheets

1

IMAGE CAPTURING METHOD FOR IMAGE RECOGNITION AND SYSTEM THEREOF

BACKGROUND OF THE INVENTION

1. Field of the Invention

The present invention relates to an image capturing method for image recognition, and more particularly, to an image capturing method for image recognition capable of activating image capturing devices according to shooting angles.

2. Description of the Prior Art

As related technology keeps improving, various kinds of human-machine interfaces are developed for assisting users to input commands into electronic devices. For example, the user can utilize a touch control technique to input a touch command on a touch screen for controlling a smartphone, or the user can utilize an image recognition technique to move his body or a pointing device in front of an image capturing device for inputting the command. The current image recognition technique already can utilize a plurality of image capturing devices for performing image recognition on a target object. The image recognition technique is capable of performing image recognition on a target object (such as the user's hand) in motion images captured by two (or more than two) image capturing devices, in order to identify the command inputted by the target object. Since the image recognition technique can obtain position information of the target object in the three-dimensional space, the image recognition technique is more accurate than traditional image recognition technique, which only uses two-dimensional information.

In the image recognition technique of the prior art, data stream captured by a plurality of image capturing devices must be simultaneously transmitted to an image processor of an image recognition device in real time for performing image recognition. However, when the resolution of the image is large, data volume of the images transmitted to the image processor is also large, accordingly, the image processor requires large memory and needs to process more tasks. Therefore, the image recognition technique of the prior art requires larger bandwidth for data transmission, and power consumption of the image capturing system is increased correspondingly.

SUMMARY OF THE INVENTION

The present invention provides an image capturing method for image recognition. The image capturing method comprises providing at least three image capturing devices arranged along a same direction and an image processor; the at least three image capturing devices capturing at least three first images; determining a target object in the at least three first images; activating a first pair of image capturing devices of the at least three image capturing devices according to shooting angles of the target object in the at least three first images in order to capture a first pair of motion images; and the image processor performing image recognition on the target object according to the first pair of motion images.

The present invention further provides an image capturing system for image recognition. The image capturing system comprises at least three image capturing devices arranged along a same direction, and a controller coupled to the at least three image capturing devices. The controller comprises a sensor selection module and an input/output interface. The sensor selection module is for determining a target object in at least three first images according to the at least three first images captured by the at least three image capturing devices, and for activating a first pair of image capturing devices of the at least three image capturing devices according to shooting angles of the target object in the at least three first images in order to capture a first pair of motion images. The input/output interface is for transmitting motion images of the target object to an image processor according to the first pair of motion images in order to perform image recognition on the target object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
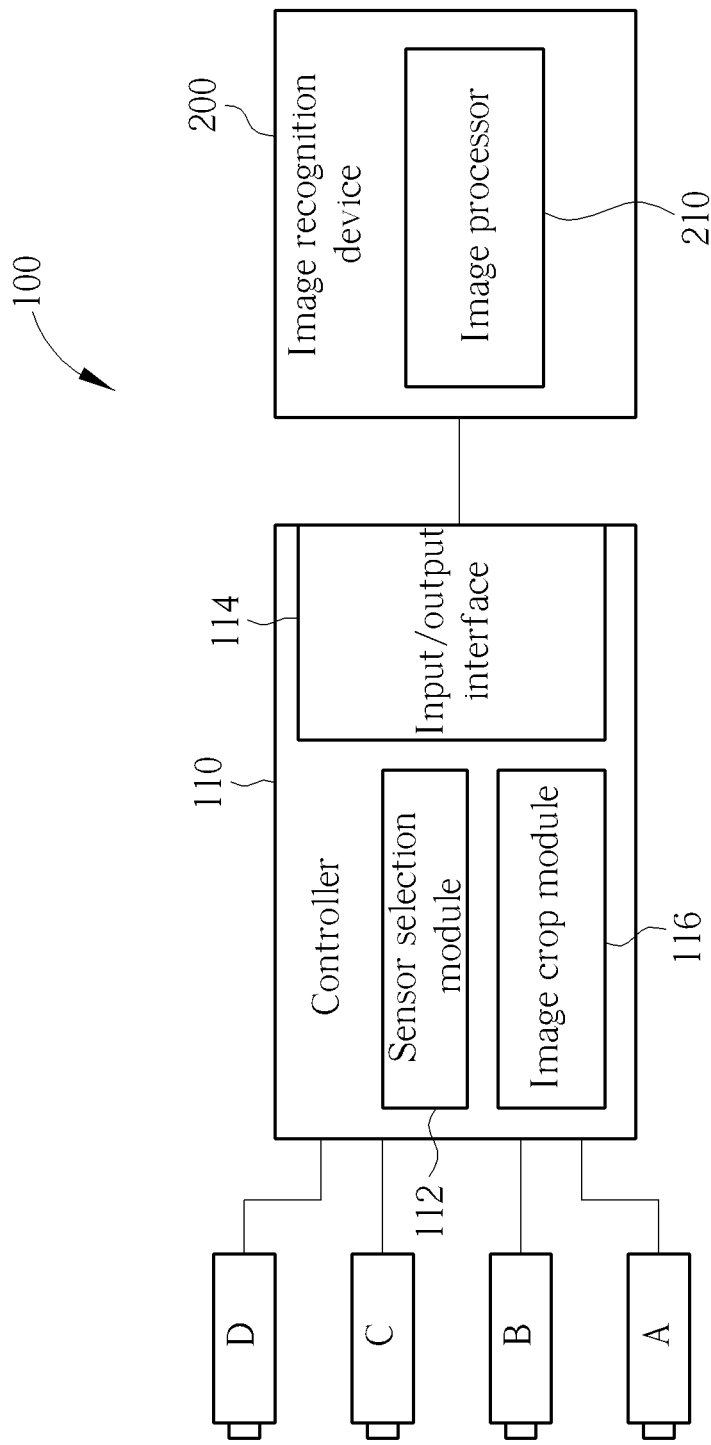
FIG. 1 is a diagram showing an image capturing system for image recognition of the present invention.

Please refer to FIG. 1. FIG. 1 is a diagram showing an image capturing system for image recognition of the present invention. As shown in FIG. 1, the image capturing system 100 of the present invention comprises a plurality of image capturing devices A, B, C, D, and a controller 110. The plurality of image capturing devices A, B, C, D are arranged along a same direction for capturing images with different visual angles. The controller 110 is coupled to the plurality of image capturing devices A, B, C, D. The controller 110 comprises a sensor selection module 112 and an input/output interface 114. The sensor selection module 112 is for selectively activating a pair of image capturing devices of the plurality of image capturing devices A, B, C, D according to shooting angles of a target object in the plurality of image capturing devices A, B, C, D in order to capture two motion images with different visual angles. The input/output interface 114 is for transmitting the motion images captured by the activated image capturing devices to an image processor 210 of an image recognition device 200 in order to perform image recognition.

Figure 2:
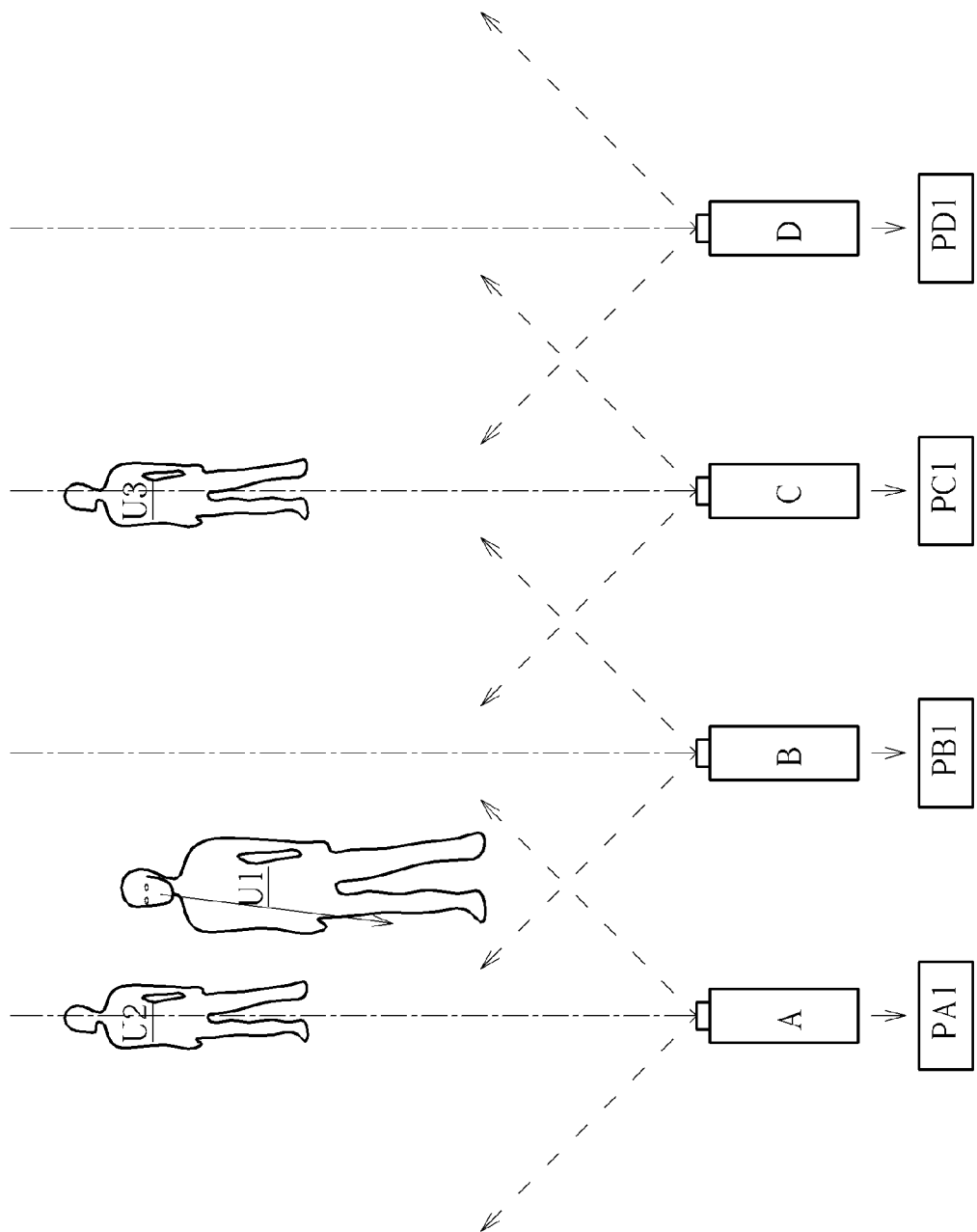
FIG. 2 is a diagram showing the image capturing system in FIG. 1 activating a first pair of image capturing devices according to a position of the target object.
Figure 3:
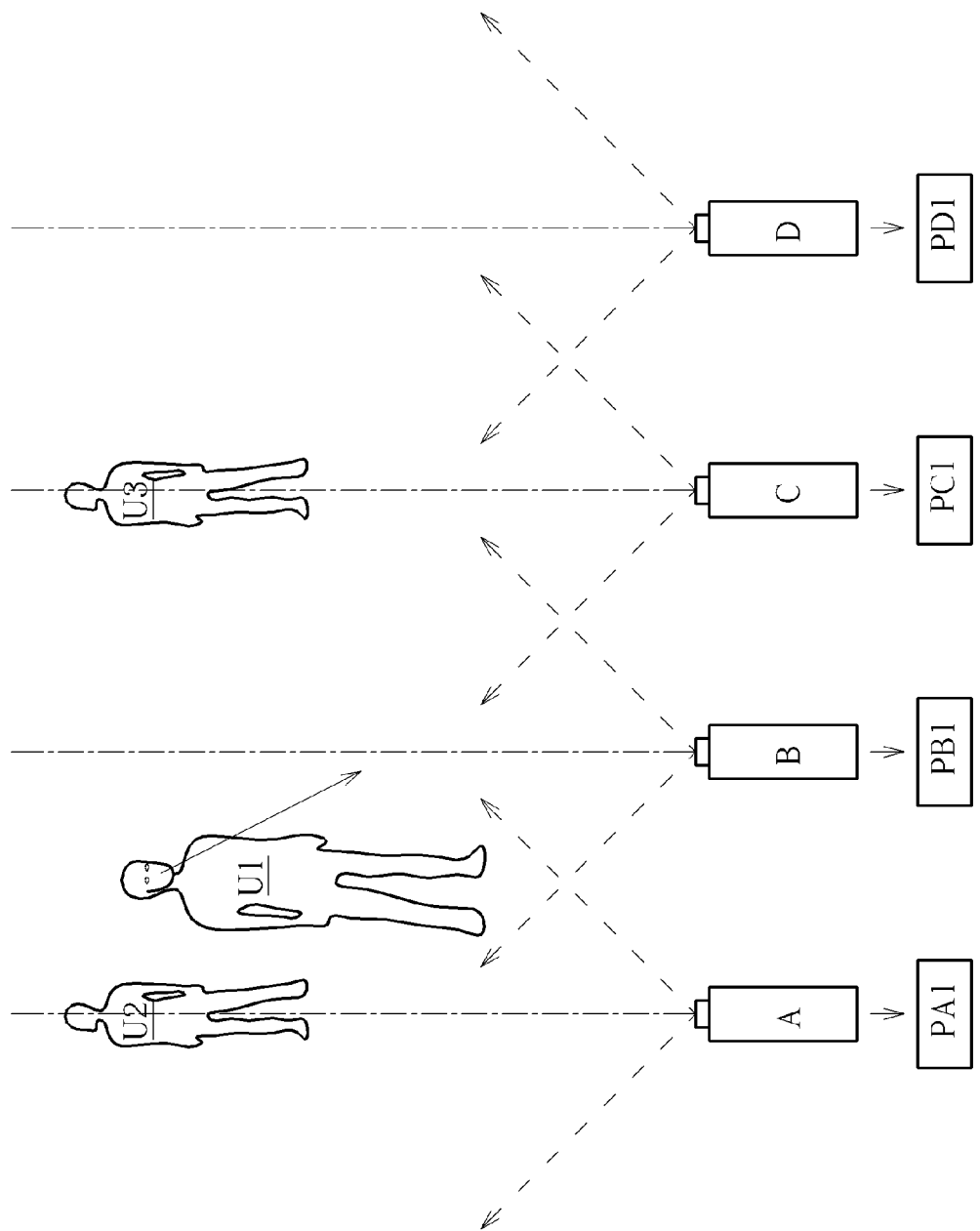
FIG. 3 is a diagram showing the image capturing system in FIG. 1 activating a second pair of image capturing devices according to the position of the target object.
Figure 4:
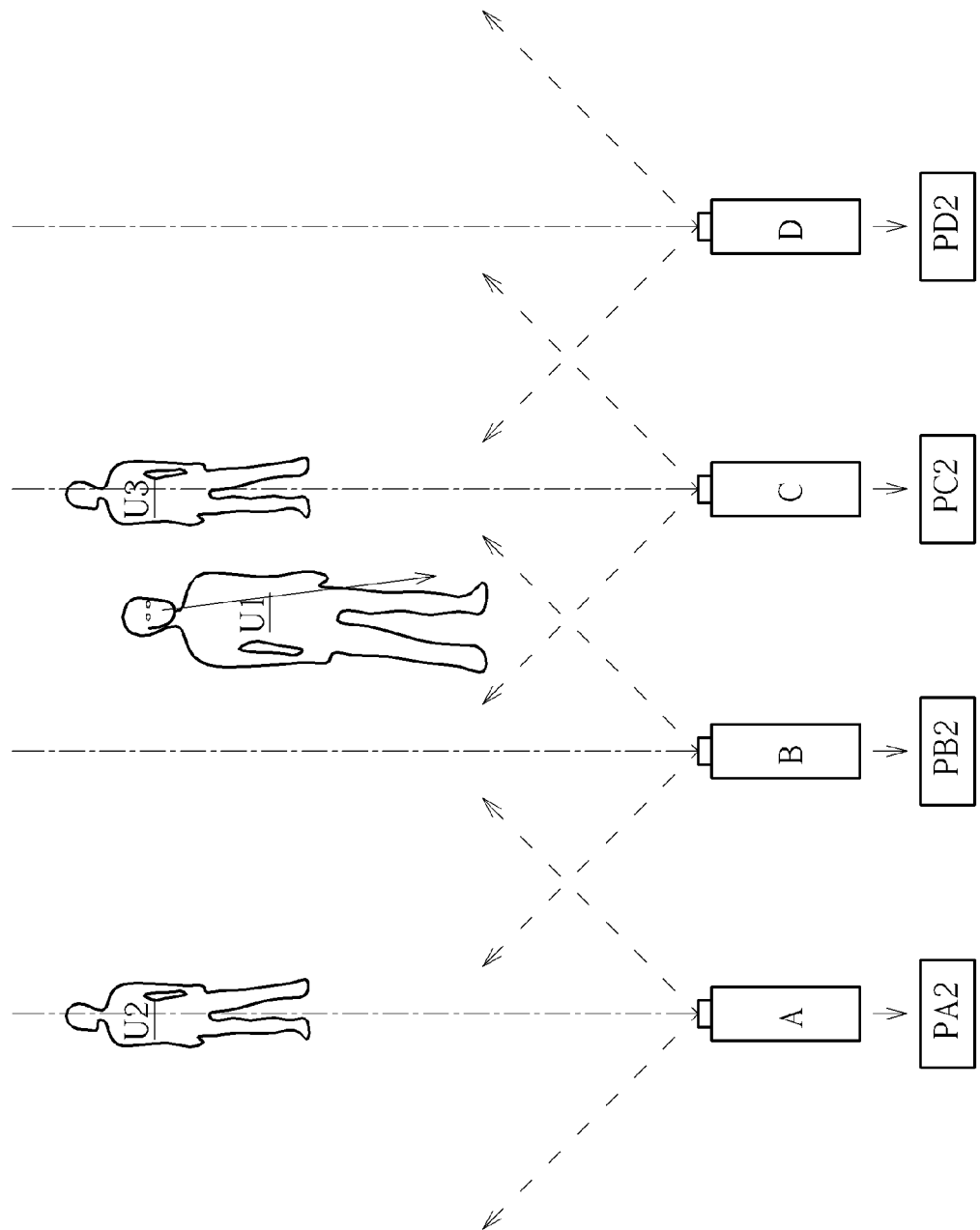
FIG. 4 is a diagram showing the image capturing system in FIG. 1 activating a second pair of image capturing devices according to the position of the target object.
Figure 5:
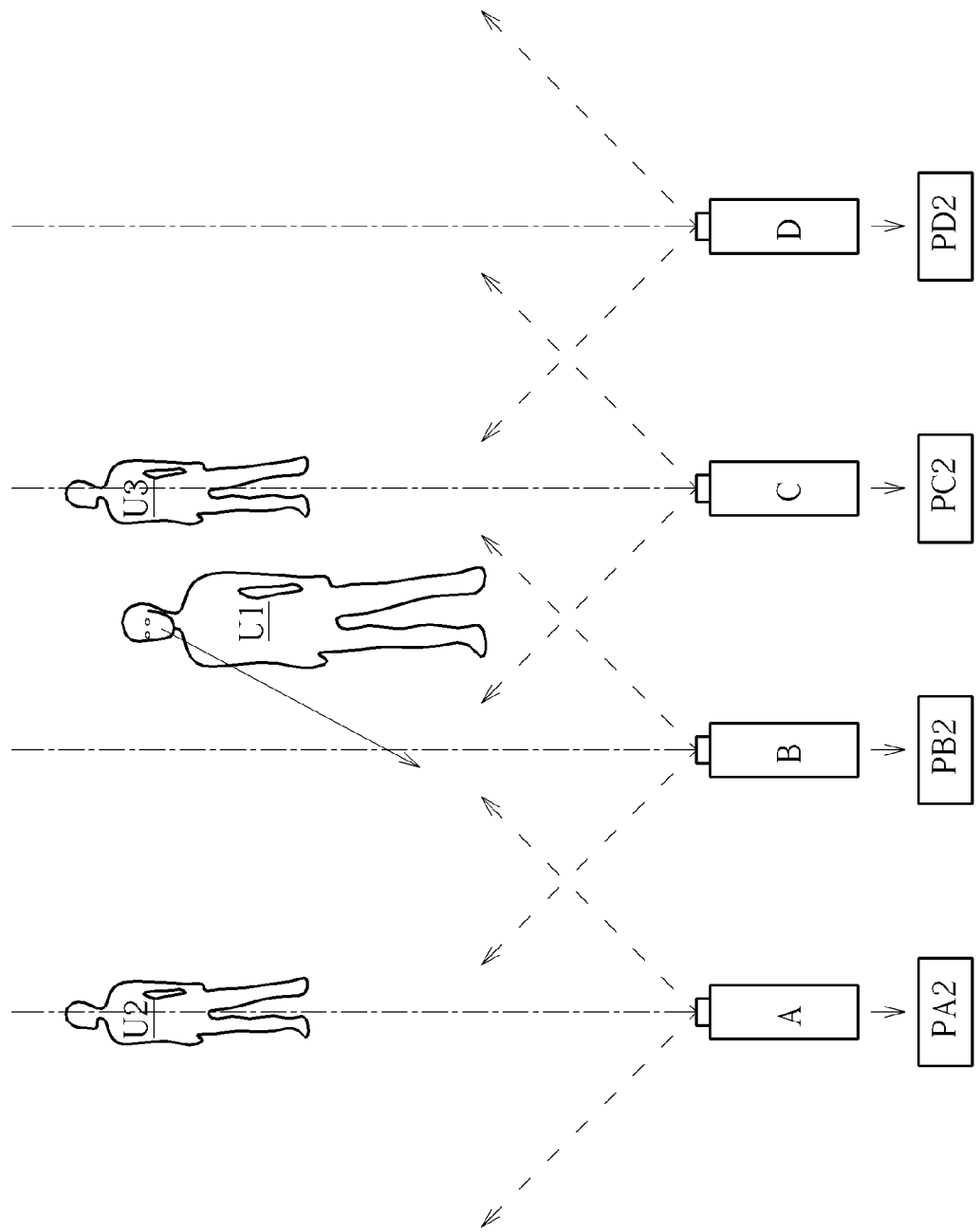
FIG. 5 is a diagram showing the image capturing system in FIG. 1 activating the first pair of image capturing devices according to the position of the target object.

Please to refer to FIG. 2 to FIG. 5, and refer to FIG. 1 as well. FIG. 2 and FIG. 5 are diagrams showing the image capturing system of FIG. 1 activating a first pair of image capturing devices according to a position of the target object. FIG. 3 and FIG. 4 are diagrams showing the image capturing system in FIG. 1 activating a second pair of image capturing devices according to the position of the target object. As shown in FIG. 2, the sensor selection module 112 of the controller 110 can determine the target object in images captured by the image capturing devices A, B, C, D. In one embodiment, the sensor selection module 112 can determine an object U1 with a largest image size (that is, the nearest object) to be the target object according to image sizes of a plurality of objects U1, U2, U3 in four first images PA1, PB1, PC1, PD1 respectively captured by the image capturing devices A, B, C, D. In another embodiment, the sensor selection module 112 can determine the target object by detecting a human body/face in the four first images PA1, PB1, PC1, PD1 captured by the image capturing devices A, B, C, D. For example, when the object U1 is the human body/face and the objects U2, U3 are furniture or other objects, the sensor selection module 112 can detect that the object U1 is the human body/face and further determine the object U1 is the target object (the image size of the object U1 is not necessary to be the largest, and the object U1 is not necessary to be closest to the image capturing devices A, B, C, D). In another embodiment, the sensor selection module 112 can identify a particular human body/face as the target object in the four first images PA1, PB1, PC1, PD1 captured by the image capturing devices A, B, C, D. For example, when the objects U1, U2, U3 are the human bodies/faces, and the human body/face image of the objects U1 is pre-stored in the sensor selection module 112, the sensor selection module 112 can identify the object U1 as the target object among the objects U1, U2, U3. After determining the target object U1, the sensor selection module 112 selects and activates a first pair of image capturing devices with the best shooting angles according to shooting angles of the target object U1 in the four first images PA1, PB1, PC1, PD1 captured by the image capturing devices A, B, C, D, in order to capture a first pair of motion images. In the embodiment of FIG. 2, when the position of the target object U1 is closer to shooting centers of the image capturing devices A, B, and the target object U1 faces to the image capturing devices A, B, the sensor selection module 112 can select and activate the image capturing devices A, B in order to capture the first pair of motion images. In the embodiment of FIG. 3, when the position of the target object U1 is closer to the shooting centers of the image capturing devices A, B, and the target object U1 faces to the image capturing devices B, C, the sensor selection module 112 can select and activate the image capturing devices B, C in order to capture the first pair of motion images. After capturing the first pair of motion images, the controller 110 can further transmit the first pair of motion images to the image processor 210 via the input/output interface 114 for performing the image recognition on the target object in the first pair of motion images, such as recognizing a gesture of a user, and for correspondingly generating a command according to a result of the image recognition on the target object U1. The above image capturing devices not being activated can still periodically capture images for assisting the sensor selection module 112 to determine whether the target object U1 moves. As shown in FIG. 4 and FIG. 5, when the target object U1 moves, the sensor selection module 112 can switch the activated image capturing devices from the first pair of image capturing devices to the second pair of image capturing devices with the best shooting angles according to shooting angles of the target object U1 in four second images PA2, PB2, PC2, PD2 captured by the image capturing devices A, B, C, D, in order to capture a second pair of motion images. In the embodiment of FIG. 4, when the target object U1 moves to a position closer to the shooting centers of the image capturing devices B, C, and the target object U1 faces to the image capturing devices B, C, the sensor selection module 112 can switch the activated image capturing devices to the image capturing devices B, C in order to capture the second pair of motion images. In the embodiment of FIG. 5, when the target object U1 moves to the position closer to the shooting centers of the image capturing devices B, C, and the target object U1 faces to the image capturing devices A, B, the sensor selection module 112 can switch the activated image capturing devices back to the image capturing devices A, B in order to capture the second pair of motion images. After capturing the second pair of motion images, the controller 110 further transmits the second pair of motion images to the image processor 210 via the input/output interface for performing the image recognition on the target object in the second pair of motion images, and for correspondingly generating a command according to a result of the image recognition on the target object U1.

According to the above arrangement, the controller 110 can activate two image capturing devices of the plurality of image capturing devices A, B, C, D in order to capture a pair of motion images and transmit to the image processor 210, which further reduces the amount of data transmitted from the input/output interface 114 to the image processor 210. The image processor 210 performs the image recognition only on a pair of motion images without performing the image recognition on all the motion images captured by the image capturing devices A, B, C, D. Therefore, duty of the image processor 210 can be dramatically reduced, and power consumption of the image capturing system 100 can be also reduced. In addition, the image processor 210 can process more other tasks correspondingly, that is, efficiency of the image processor 210 can be improved. Furthermore, the present invention only activates two image capturing devices of the plurality of image capturing devices A, B, C, D in order to capture motion images, and other image capturing devices not being activated only periodically captures the front images.

Figure 6:
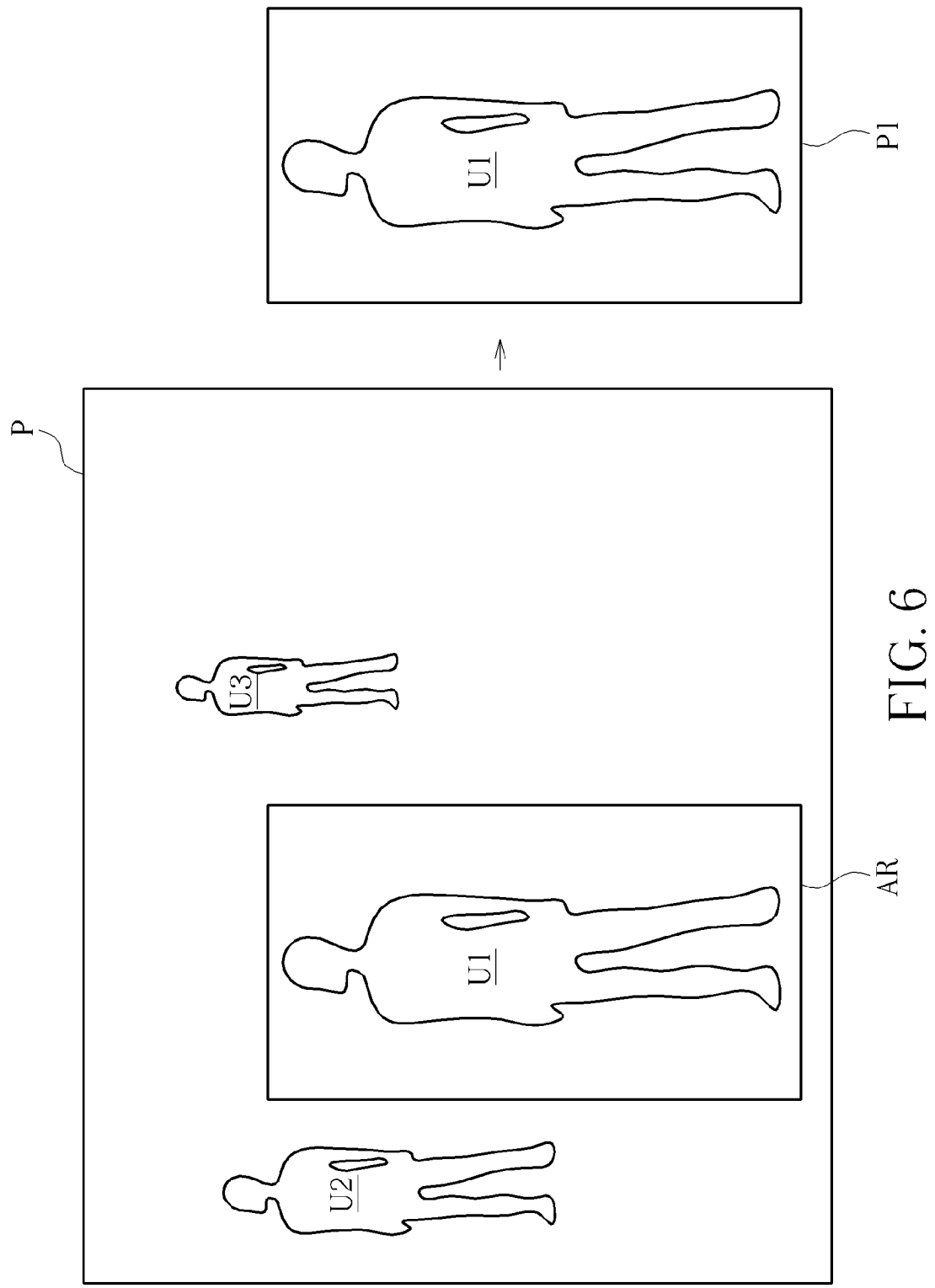
FIG. 6 is a diagram showing an image split module splitting the image of the target object from an image captured by the image capturing devices.

In order to further reduce data volume between the input/output interface 114 and the image processor 210, the controller 110 can further comprise an image crop module 116. Please refer to FIG. 6, and refer to FIG. 1 as well. FIG. 6 is a diagram showing the image crop module clipping the image of the target object from the image captured by the image capturing devices. As shown in FIG. 6, the image crop module 116 can define a region of interest AR according to an image range of the target object U1, and clip the region of interest AR from a motion image P for generating a motion clip image P1. The controller 110 further transmits a pair of motion clip images to the image processor 210 via the input/output interface 116. Since the image processor 210 only needs to perform the image recognition on one pair of motion clip images, duty of the image processor 210 can be further reduced.

In addition, besides performing the image recognition on the target object U1, the image processor 210 also can simultaneously perform the image recognition on other objects U2, U3 in the motion images. Moreover, the image crop module 116 can also define regions of interest according to image ranges of the other objects U2, U3, and clip all the regions of interest from the motion images for generating motion clip images. The image crop module 116 further transmits the motion clip images to the image processor 210 for performing the image recognition on the target object U1 and the other object U2, U3.

In the above embodiments, the image capturing system 100 of present invention comprises four image capturing devices. However, the image capturing system 100 of the present invention is not limited to four image capturing devices. The image capturing system 100 of the present invention can comprise three or more than three image capturing devices in other embodiments.

Figure 7:
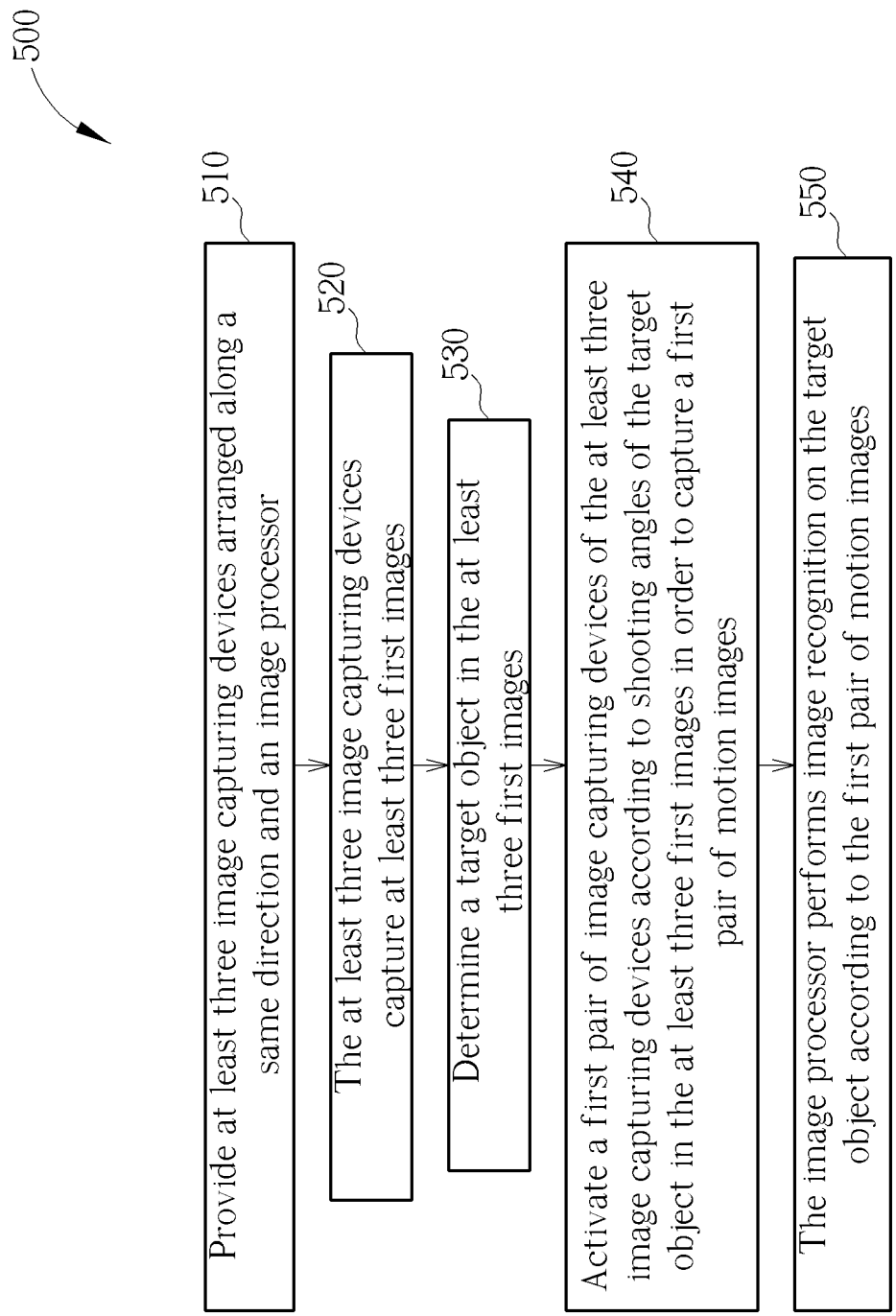
FIG. 7 is a flowchart showing an image capturing method for image recognition of the present invention.

Please refer to FIG. 7. FIG. 7 is a flowchart 500 showing an image capturing method for image recognition of the present invention. The flowchart of the image capturing method for image recognition of the present invention comprises the following steps:

Step 510: Provide at least three image capturing devices arranged along a same direction and an image processor;

Step 520: The at least three image capturing devices capture at least three first images;

Step 530: Determine a target object in the at least three first images;

Step 540: Activate a first pair of image capturing devices of the at least three image capturing devices according to shooting angles of the target object in the at least three first images in order to capture a first pair of motion images; and Step 550: The image processor performs image recognition on the target object according to the first pair of motion images.

In contrast to the prior art, the image capturing method for image recognition of the present invention can activate two image capturing devices of the plurality of image capturing devices according to the shooting angles of the target object in order to capture motion images. And the method of the present invention can further clip the regions of interest from the motion images for performing the image recognition. Therefore, the image capturing method of the present invention can reduce required bandwidth for data transmission and required tasks processed by the image processor, so as to reduce the power consumption of the image capturing system correspondingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing method for image recognition, comprising:
    providing at least three image capturing devices arranged along a same direction and an image processor;
    the at least three image capturing devices capturing at least three first images;
    determining a target object in the at least three first images;
    activating a first pair of image capturing devices of the at least three image capturing devices according to shooting angles of the target object in the at least three first images in order to capture a first pair of motion images by activating the first pair of image capturing devices with shooting centers closer to the target object; and
    the image processor performing image recognition on the target object according to the first pair of motion images.

2. The image capturing method of claim 1, wherein determining the target object in the at least three first images comprises determining the target object in the at least three first images according to image sizes of a plurality of objects in the at least three first images.

3. The image capturing method of claim 1, wherein determining the target object in the at least three first images comprises determining the target object in the at least three first images by detecting human body/face images in the at least three first images.

4. The image capturing method of claim 1, wherein activating the first pair of image capturing devices of the at least three image capturing devices according to the shooting angles of the target object in the at least three first images comprises activating the first pair of image capturing devices shooting front images of the target object.

5. The image capturing method of claim 1, further comprising:
    clipping images of the target object from the first pair of motion images for generating a first pair of motion clip images of the target object; and
    transmitting the first pair of motion clip images to the image processor;
    wherein the image processor performing image recognition on the target object according to the first pair of motion images comprises the image processor performing image recognition on the target object according to the first pair of motion clip images of the target object.

6. The image capturing method of claim 1, further comprising:
    the at least three image capturing devices capturing at least three second images;
    determining the target object in the at least three second images;
    activating a second pair of image capturing devices of the at least three image capturing devices according to shooting angles of the target object in the at least three second images in order to capture a second pair of motion images; and
    the image processor performing image recognition on the target object according to the second pair of motion images.

7. The image capturing method of claim 1, wherein the image processor performing image recognition on the target object according to the first pair of motion images comprises the image processor performing three-dimensional image recognition on the target object according to the first pair of motion images.

8. The image capturing method of claim 1 further comprising the image processor generating a command according to a result of image recognition on the target object.

9. The image capturing method of claim 1, wherein the image processor performing image recognition on the target object according to the first pair of motion images comprises the image processor performing image recognition on the target object and other objects according to the first pair of motion images.

10. An image capturing system for image recognition, comprising:
    at least three image capturing devices arranged along a same direction; and
    a controller coupled to the at least three image capturing devices, the controller comprising:
    a sensor selection module for determining a target object in at least three first images according to the at least three first images captured by the at least three image capturing devices, and for activating a first pair of image capturing devices of the at least three image capturing devices according to shooting angles of the target object in the at least three first images in order to capture a first pair of motion images by activating the first pair of image capturing devices with shooting centers closer to the target object; and
    an input/output interface for transmitting motion images of the target object to an image processor according to the first pair of motion images in order to perform image recognition on the target object.

11. The image capturing system of claim 10, wherein the sensor selection module determines the target object in the at least three first images according to image sizes of a plurality of objects in the at least three first images.

12. The image capturing system of claim 10, wherein the sensor selection module determines the target object in the at least three first images by detecting human body/face images in the at least three first images.

13. The image capturing system of claim 10, further comprising:
    an image crop module for clipping the images of the target object from the first pair of motion images for generating a first pair of motion clip images of the target object,
    wherein the input/output interface is for transmitting the first pair of motion clip images of the target object to the image processor for performing image recognition on the target object.

\* \* \* \* \*